Oct. 16, 1945.                P. A. BIRDICK                    2,387,113
                              OPTICAL SYSTEM
                          Filed May 28, 1943              2 Sheets-Sheet 1
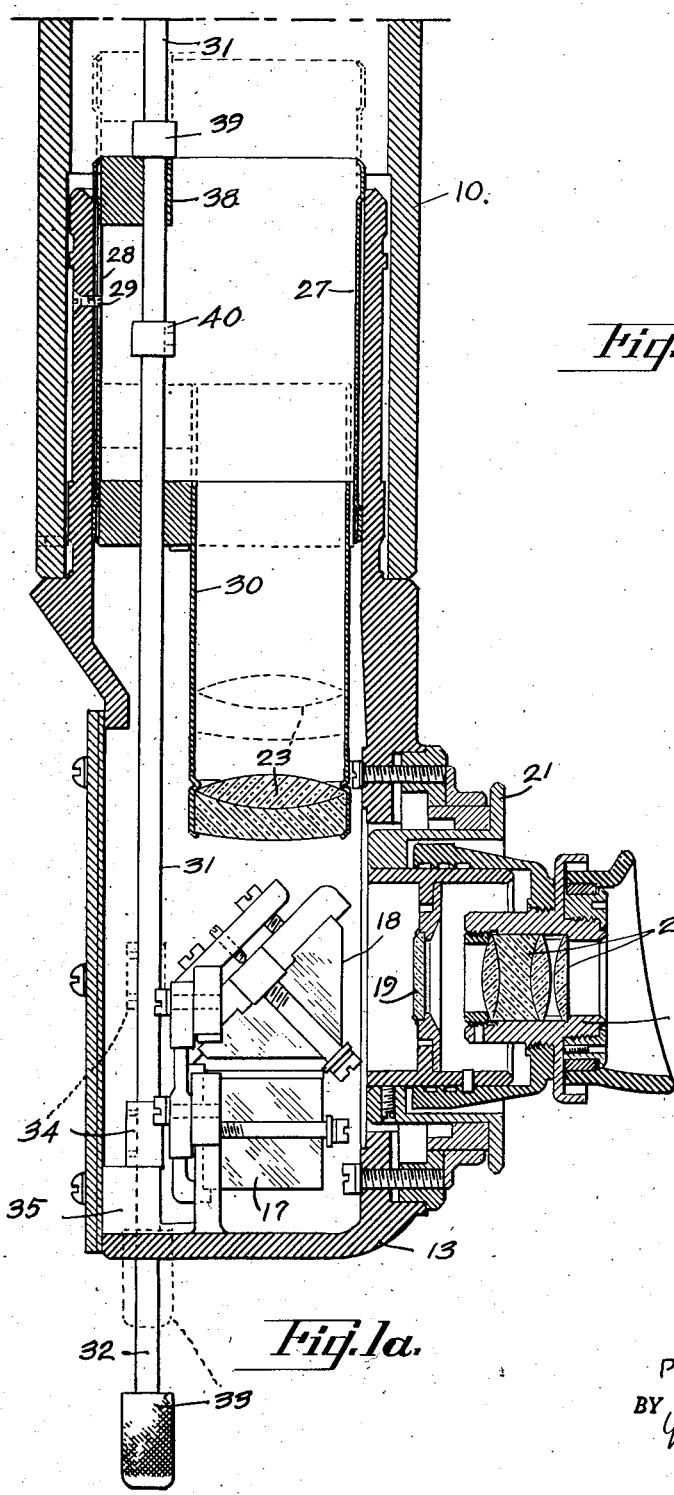
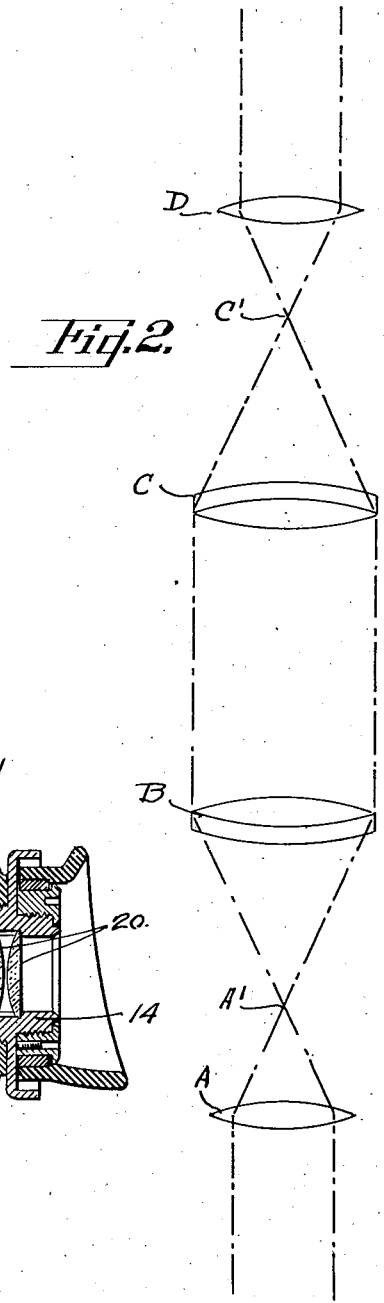
INVENTOR.
PHILIP A. BIRDICK
BY
ATTORNEYS.

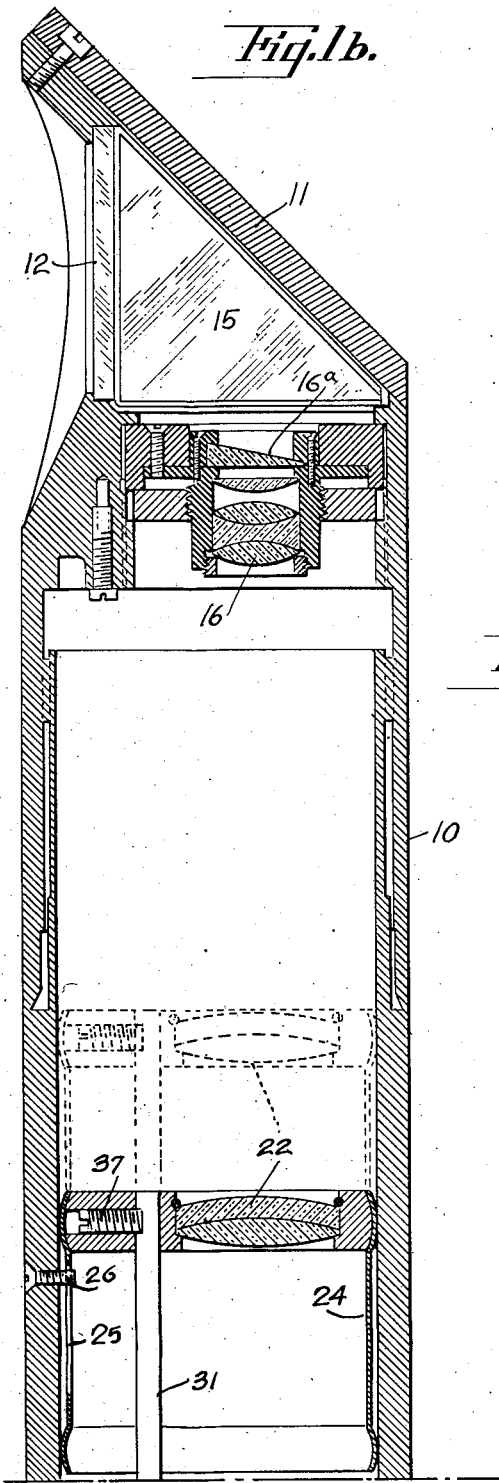
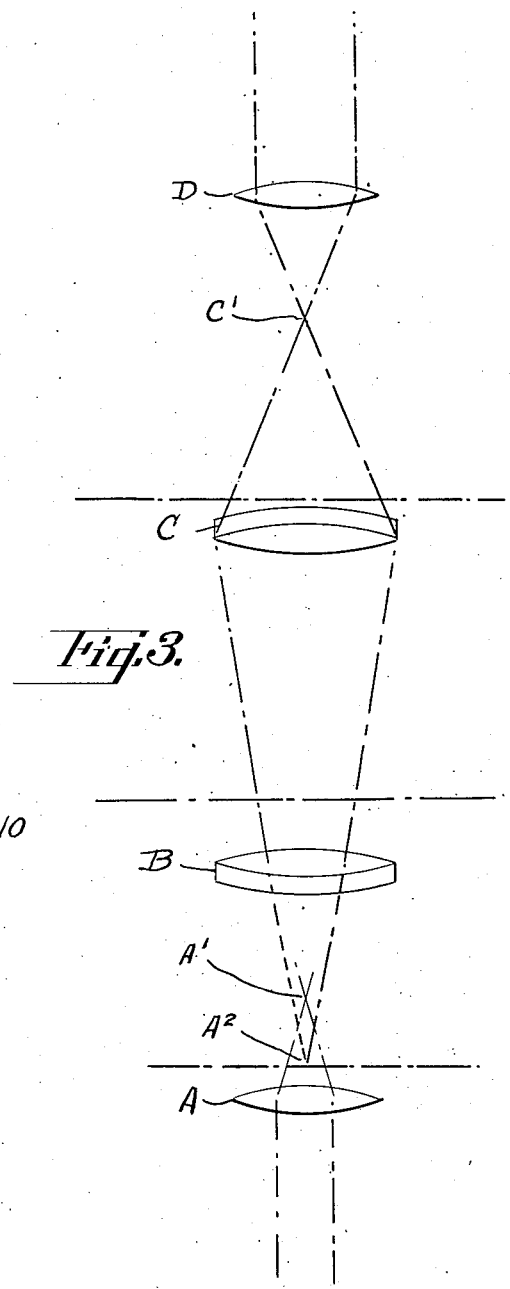

Patented Oct. 16, 1945

2,387,113

UNITED STATES PATENT OFFICE 2,387,113

OPTICAL SYSTEM

Philip A. Birdick, Berkeley, Calif.

Application May 28, 1943, Serial No. 488,813

6 Claims. (Cl. 88—32)

My invention relates to telescope construction and more particularly to improvement in the periscopic telescope used on aircraft as drift sights to measure the angle of horizontal drift. By making the necessary correction indicated by the horizontal drift sight, the pilot determines the true direction of flight, and the true ground speed may also be determined by timing the passage of observed objects between "speed lines" on a grid forming part of the instrument.

Conditions arising with different altitudes and different terrain make it extremely desirable that different powers be available and that means be provided for shifting from one power to another substantially instantaneously. Accordingly, a primary purpose of my invention is to provide rapid, simple means for changing the adjustment of the optical system of a drift sight from one definite power to another definite power without leaving any possibility that the operator or pilot may obtain any other intermediate power when the system is correctly adjusted, accuracy being essential in order that standardized computing means may be used in calculating speeds.

I have attained the advantages sought by incorporating in the telescope body of the drift sight a readily displaceable or adjustable reversing lens system permitting reduction of power with increase of field and vice versa. The preferred embodiment of my invention is hereinafter more specifically described and is illustrated in the accompanying drawings, where:

Figures 1a and 1b, taken together, show a longitudinal section taken on the axis of a periscopic drift sight or telescope embodying the improvements of my invention; and Figures 2 and 3 are diagrammatic illustrations representing the optical elements of a drift sight telescope with a reversing system displaceable according to the principle of my invention.

The horizontal drift sight or telescope incorporating my invention consists generally of the elongated tubular body portion 10 designed to be mounted in horizontal position through a wall of the fuselage with the objective end 11 located outside and the window 12 thereof presented downward, with the ocular end 13 extending into the navigator's station and being located so that he can look directly down into the eyepiece 14.

The rays of light from the object on the ground are admitted through the objective window 12 and are directed by the Porro prism 15 through the objective lens system at 16 and thence along the objective tube. At the end of the tube the light is projected upward by the two reflecting prisms 17, 18 to a focal point on a grid 19 under the ocular system 20 of the eye piece. Rotation of the ring 21 is effected in measuring the drift. The foregoing general structure is known in the art and forms no part of my invention except as it cooperates therewith. A detailed description of the mounting of the prisms above mentioned is omitted as unnecessary, the same being that of a conventional horizontal drift sight.

In the structure of my invention the lenses 22 and 23 of an intermediate reversing system are mounted in the tubular body of the instrument for longitudinal axial adjustment therein and with respect to one another. To provide for such differential adjustment or shift of the lenses and for determining and fixing the range of such shift, lens 22 is mounted in a carrier sleeve 24 in slidable engagement with the wall of the instrument body and the sleeve is formed with a longitudinally extending slot at 25 which engages the end of a guide screw 26. Lens 23 is mounted in a similar sleeve 27 likewise provided with a guide slot at 28 engaged by the guide screw 29. These guide slots and screws prevent rotation of the sleeves. On this carriage there is a rearwardly extending offset tubular extension 30 for the lens mounting in alignment with lens 22. The shifting means preferably consists of the adjusting rod 31 mounted within the casing and having an operating end 32 extending through the ocular end wall thereof. A knurled head 33 is adjustably secured on the end of rod 31, as by set screws. This head limits inward sliding movement of rod 31 by engagement with the casing and its outward sliding movement is limited by a stop collar 34 which contacts an abutment 35 inside the casing. The rod 31 extends forwardly to the carrier sleeve 24 of lens 22 and is fixed thereto at 36 by a set screw 37. Intermediate its ends the rod 31 has a lost motion connection with sleeve 27 of lens 23. To provide this, rod 31 passes slidably through an abutment 38 fixed to sleeve 27 and has opposed stop collars 39 and 40, spaced a predetermined distance and located on the opposite sides of abutment 38. All of the stop collars, as well as the connection of rod 31 to sleeve 24, are held by set screws or the like, and are capable of adjustment on the rod for calibration. The dotted line positions of the carrier sleeves, stops, et cetera, shown on Figures 1a and 1b, indicate the range of movement provided for. Lens 23, therefore, has less range of movement than lens 22 due to the delayed engagement of stops 39 and 40 with abutment 38.

For cooperation with the intermediate lens system just described, a short focus lens 16 is provided as the objective. In order to direct light through the optical system from a point not directly below window 12, a prism 16a is preferably added. This is often useful in reducing the intrusion of the aircraft body in the field of view.

On the drawings, Figures 2 and 3 represent the optical elements of a drift sight telescope with a reversing system which is displaceable or shiftable, according to my invention. The lenses A and D represent the objective and the ocular lenses respectively, the lenses B and C constituting the intermediate reversing system. In Figure 2 a condition is represented in which light from a distant object enters the objective A and is brought to a focus at A'. This real image becomes the object for the lens B and since in this instance the focal planes of lens A and B coincide, light leaves B in parallel lines and is refocused at C' by lens C. As the focal planes of lens C and D coincide, the light rays leave the system parallel. This arrangement has a power of 1, or no magnification.

For better understanding of Figure 3, illustrating the effect of shift in position of the intermediate reversing system lenses, the objective and ocular lens systems A and D can each be assumed to have a focal length of 1.138", and the intermediate lenses B, C, each a focal length of 5.25", and that these are a distance of 22.5" apart. If rod head 33 is pushed to "in" position, as indicated in dotted lines in Figure 1a, lens 22, which is represented as B in Figure 3, is moved 1.5" closer to A (objective 16), and lens 23, which is C of Figure 3, is moved .75" closer to A. Referring now to Figure 3, light from a distant object is focused at A' which becomes the object of B. As the image at A' is within the focal length of lens B, a virtual image results at $A^2$, 13.1" in front of lens B. The image at $A^2$ now acts as the object for lens C, and the resulting image is at C', and thus parallel rays leave the system. The power in this instance is −2. Diminution is, therefore, effected through movement of the intermediate lenses towards the objective. Through proper adjustment of the stop collars 34, 39, 40, and head 33, intermediate lens adjustments may be obtained which will give intermediate powers. By adjustment of these elements any two powers may be obtained, i. e., great and small diminution of the object viewed, diminution and 1 power, diminution and magnification, 1 power and magnification or low and high magnification. It must of course be understood that for any given position of one lens of the reversing system, there is a definite position for the other lens, unless the distance between the objective and ocular lenses are altered also. However, the objective is preferably fixed and the ocular is moved only for focusing.

When the two erector lenses B and C of Figures 2 and 3 are moved from a position, in which their respective distances from the first and second images A' and C' are equal to their respective focal lengths and light from a point in the plane of the first image is parallel after refraction at the first erector lens then convergent after refraction at the second erector lens toward a point in the plane of the second image, forward toward the objective lens to positions such that light from a point in the plane of the first image will be divergent after refraction at the first erector lens B then convergent after refraction at the second erector lens C toward a point in the plane of the secondary image C' which remains the same distance from the objective image as it was in the first case, the separation between two given points in the ocular image will be less than the separation between the same points in the ocular image which was formed before the erector lenses were moved.

By moving both of the erector lenses toward or from the objective lens by methods heretofore described, or combinations thereof, it is apparent, as previously mentioned, that any two sizes of the ocular image may be obtained; i. e., great and small diminution, diminutiton and unit size, diminution and enlargement, unit size and enlargement, or small and great enlargement.

An ocular image of the unit size would be an image in which two points of given separation would be conjugate with two other identical points in the objective image of equal separation.

It should be noted also that while the lenses are being adjusted from one position to the other during the process of shifting powers, objects viewed through the system will be very blurred and consequently there is no possibility of making readings while the power is not at either of the two particular powers for which the shifting system has been adjusted.

Variations of the specific structures disclosed may, of course, be made within the scope of the invention as defined in the following claims.

I claim:

1. In a telescope of the class described, a stationary objective lens and an ocular lens movable only for individual focusing on a stationary ocular image, two differentially movable positive erector lenses for producing said image; said erector lenses being situated intermediate the objective and ocular lenses, means for moving and for guiding said erector lenses for movement in the same direction and to different extents from first positions of minimum separation, in which light from a point in the plane of the objective image is divergent after refraction at the first erector then convergent after refraction at the second erector toward a point in the plane of the ocular image, to second positions of maximum separation nearer the objective lens such that light from a point in the plane of the objective image will be more divergent after refraction at the first erector and less convergent after refraction at the second erector toward a point in the plane of the ocular image, the separation between two given points in said ocular image being less than the separation between the same two points in the ocular image which was formed before the shift was made, and means for arresting and holding said erector lenses in their said positions of minimum and maximum separation, respectively.

2. In a telescope of the class described a stationary objective lens and an ocular lens movable only for individual focusing on a stationary ocular image, two differentially movable positive erector lenses for producing said image; said erector lenses being situated intermediate the objective and ocular lenses, means for moving and for guiding said erector lenses for movement in the same direction and to different extents from first positions of minimum separation, in which light from a point in the plane of the objective image is parallel after refraction at the first erector then convergent after refraction at the second erector toward a point in the plane of the ocular image, to second positions of maximum separation nearer the objective lens such that light from a point in the plane of the objective image is divergent after refraction at the first erector then convergent after refraction at the second erector toward a point in the plane of the ocular image, the separation between two given points in said ocular image being less than the separation between the same two points in the ocular image which was formed before the shift was made, and means for arresting and holding said erector lenses in their said positions of minimum and maximum separation, respectively.

3. In a telescope of the class described a stationary objective lens and an ocular lens movable only for individual focusing on a stationary ocular image, two differentially movable positive erector lenses for producing said image; said erector lenses being situated intermediate the objective and ocular lenses, means for moving and for guiding said lenses for movement in the same directions and to the same extent from first positions, in which light from a point in the plane of the objective image is convergent after refraction at the first erector then convergent after refraction at the second erector lens toward a point in the plane of the ocular image, to second positions nearer the objective lens such that light from a point in the plane of the objective image is divergent after refraction at the first erector and convergent after refraction at the second erector toward a point in the plane of the ocular image, the separation between two given points in said ocular image being less than the separation between the same two points in the ocular image which was formed before the shift was made, and means for arresting and holding said erector lenses in their said first and second positions, respectively.

4. In a telescope of the class described a stationary objective lens and an ocular lens movable only for individual focusing on a stationary ocular image, two differentially movable positive erector lenses for producing said image; said erector lenses being situated intermediate the objective and ocular lenses, means for moving and for guiding said erector lenses for movement in the same direction and to different extents from first positions of maximum separation, in which light from a point in the plane of the objective image is convergent after refraction at the first erector then convergent after refraction at the second erector toward a point in the plane of the ocular image, to second positions of minimum separation nearer the objective lens such that light from a point in the plane of the objective image is parallel after refraction at the first erector lens then convergent after refraction at the second erector lens toward a point in the plane of the ocular image, the separation between two given points in said ocular image being less than the separation between the same two points in the ocular image which was formed before the shift was made, and means for arresting and holding said erector lenses in their said positions of maximum and minimum separation, respectively.

5. In a telescope of the class described a stationary objective lens and an ocular lens adjustable only for individual focusing on a stationary ocular image, two differentially movable positive erector lenses for producing said image; said erector lenses being situated intermediate the objective and ocular lenses, means for moving and for guiding said erector lenses for movement in the same direction and to different extents from first positions of maximum separation, in which light from a point in the plane of the objective image is convergent after refraction at the first erector then convergent after refraction at the second erector toward a point in the plane of the ocular image, to second positions of minimum separation nearer the objective lens such that light from a point in the plane of the objective image will be less convergent after refraction at the first erector then less convergent after refraction at the second erector toward a point in the plane of the ocular image, the separation between two given points in said ocular image being less than the separation between the same two points in the ocular image which was formed before the shift was made, and means for arresting and holding said erector lenses in their said positions of minimum and maximum separation, respectively.

6. In a telescope of the class described a stationary objective lens and an ocular lens movable only for individual focusing on a stationary ocular image, two differentially movable positive erector lenses for producing said image; two sleeves each containing mounted therein one of said erectors and each slidable axially in the tubular body of the telescope, being restricted from rotation therein by a pin projecting from the telescope wall into a straight slot in the sleeve wall, a rod connected directly to the first erector lens sleeve located nearest the objective lens and extending away from the objective lens through a hole in an abutment on the second erector lens sleeve outward through a hole in an abutment comprising the ocular end of the telescope body tube and terminating outside of the telescope with an axially adjustable knob usable as a handle for shifting the rod's position, which rod having mounted thereon first and second stop collars adjustably located on either side of the second erector lens sleeve abutment at a separation greater than the thickness at the abutment also having located thereon a third stop collar mounted in a position just on the inside of the ocular end of the telescope body tube at a distance from the knob greater than the thickness of the telescope body tube abutment, said third stop collar limiting the movement of the rod and the lens sleeves in a direction away from the objective lens by its contact with the telescope body tube abutment on the inside of said tube, said knob limiting the movement of the rod and thus the lens sleeves in a direction toward the objective lens, the stop collars and knob fastened on the rod in such manner that when the knob is pulled to out position in a direction away from the objective lens the erector lens in the first sleeve will be moved away from the objective lens an amount equal to the movement of the rod in this direction as limited by the third stop collar, the second sleeve and erector lens pulled out, by the contact of the first stop collar with the abutment on said sleeve, to a position further away from the objective lens than its original position, the total movement of said sleeve being less than the total movement of the first sleeve due to the separation between the first stop collar and the abutment of the second sleeve which existed before the shift was made, such that light from a point in the plane of the objective image is parallel after refraction of the first erector and convergent after refraction at the second erector toward a point in the plane of the ocular image, and when the knob is pushed to in position as limited by its contact with the outside ocular end abutment of the telescope case the first erector lens is moved by its sleeve toward the objective lens an amount equal to the movement of the rod and the second erector lens sleeve is pushed toward the objective lens by a lesser amount, after contact is made between the second stop collar and the abutment on said sleeve, to a position in which light from a point in the objective image is divergent after refraction at the first erector, then convergent after refraction at the second erector toward a point in the ocular image, the separation between two given points in said ocular image formed when the knob was pushed to the in position being less than the separation between the same two points in the ocular image which was formed when the knob was pulled to the out position.

PHILIP A. BIRDICK.